(12) United States Patent
Sharp et al.

(10) Patent No.: US 12,034,851 B2
(45) Date of Patent: Jul. 9, 2024

(54) TRANSACTION SECURITY TECHNIQUES

(71) Applicant: eBay Inc., San Jose, CA (US)

(72) Inventors: Scott Sharp, San Jose, CA (US); Alagu Muthuraman, Los Altos, CA (US); Phanisri Kuchibotla, Union City, CA (US); David Gandhi, San Jose, CA (US); Mahendar Madhavan, Fremont, CA (US)

(73) Assignee: EBAY INC., San Jose, CA (US)

( * ) Notice: Subject to any disclaimer, the term of this patent is extended or adjusted under 35 U.S.C. 154(b) by 350 days.

(21) Appl. No.: 17/381,461

(22) Filed: Jul. 21, 2021

(65) Prior Publication Data

US 2023/0024967 A1    Jan. 26, 2023

(51) Int. Cl.
*H04L 9/00* (2022.01)
*H04L 9/30* (2006.01)
*H04L 9/32* (2006.01)

(52) U.S. Cl.
CPC . *H04L 9/32* (2013.01); *H04L 9/30* (2013.01)

(58) Field of Classification Search
CPC ........... H04L 9/32; H04L 9/30; G06Q 20/027; G06Q 20/12; G06Q 20/4014; G06Q 20/409
See application file for complete search history.

(56) References Cited

U.S. PATENT DOCUMENTS

| | | | |
|---|---|---|---|
| 9,596,237 B2* | 3/2017 | Law | G06Q 20/3821 |
| 2003/0154406 A1* | 8/2003 | Honarvar | G07C 9/37 713/153 |

(Continued)

FOREIGN PATENT DOCUMENTS

| | | | |
|---|---|---|---|
| AU | 2022206766 | 2/2023 | |
| EP | 4123534 | 1/2023 | |
| WO | WO-2016097718 A1 * | 6/2016 | ............. G06Q 20/20 |

OTHER PUBLICATIONS

Urvashi Kishnani; Sanchari Das; Naheem Noah; Rinku Dewri; "Assessing Security, Privacy, User Interaction, and Accessibility Features in Popular E-Payment Applications"; EuroUSEC '23: Proceedings of the 2023 European Symposium on Usable Security; Oct. 2023; pp. 143-157 (Year: 2023).*

(Continued)

*Primary Examiner* — Fatoumata Traore
*Assistant Examiner* — Courtney D Fields
(74) *Attorney, Agent, or Firm* — SCHWEGMAN LUNDBERG & WOESSNER, P.A.

(57) ABSTRACT

Aspects of the present disclosure relate to transaction security techniques. In examples, a resource platform causes a set of executable verification instructions associated with an authorization processor to be executed by a user computing device. The verification instructions may be encrypted by the authorization processor for decryption by the user computing device. The verification instructions may generate verification information associated with the user computing device. In some instances, the verification information may be encrypted for decryption by the authorization processor. The encrypted verification instructions may be provided to the authorization processor (e.g., via the resource platform), such that the authorization processor may provide an indication to the resource platform as to whether the verification is verified. Accordingly, if the verification information is verified a transaction associated with the resource platform may proceed or, as another example, the user computing device may be granted access to information.

20 Claims, 7 Drawing Sheets

(56) References Cited

U.S. PATENT DOCUMENTS

| | | |
|---|---|---|
| 2011/0086616 A1 | 4/2011 | Brand et al. |
| 2018/0293579 A1* | 10/2018 | Tetali ................ G06Q 20/3674 |
| 2018/0322497 A1 | 11/2018 | Lewis |
| 2020/0007536 A1 | 1/2020 | Piel |
| 2020/0402046 A1 | 12/2020 | Streuter et al. |

OTHER PUBLICATIONS

"European Application Serial No. 22185173.6, Extended European Search Report dated Dec. 13, 2022", 8 pgs.

\* cited by examiner

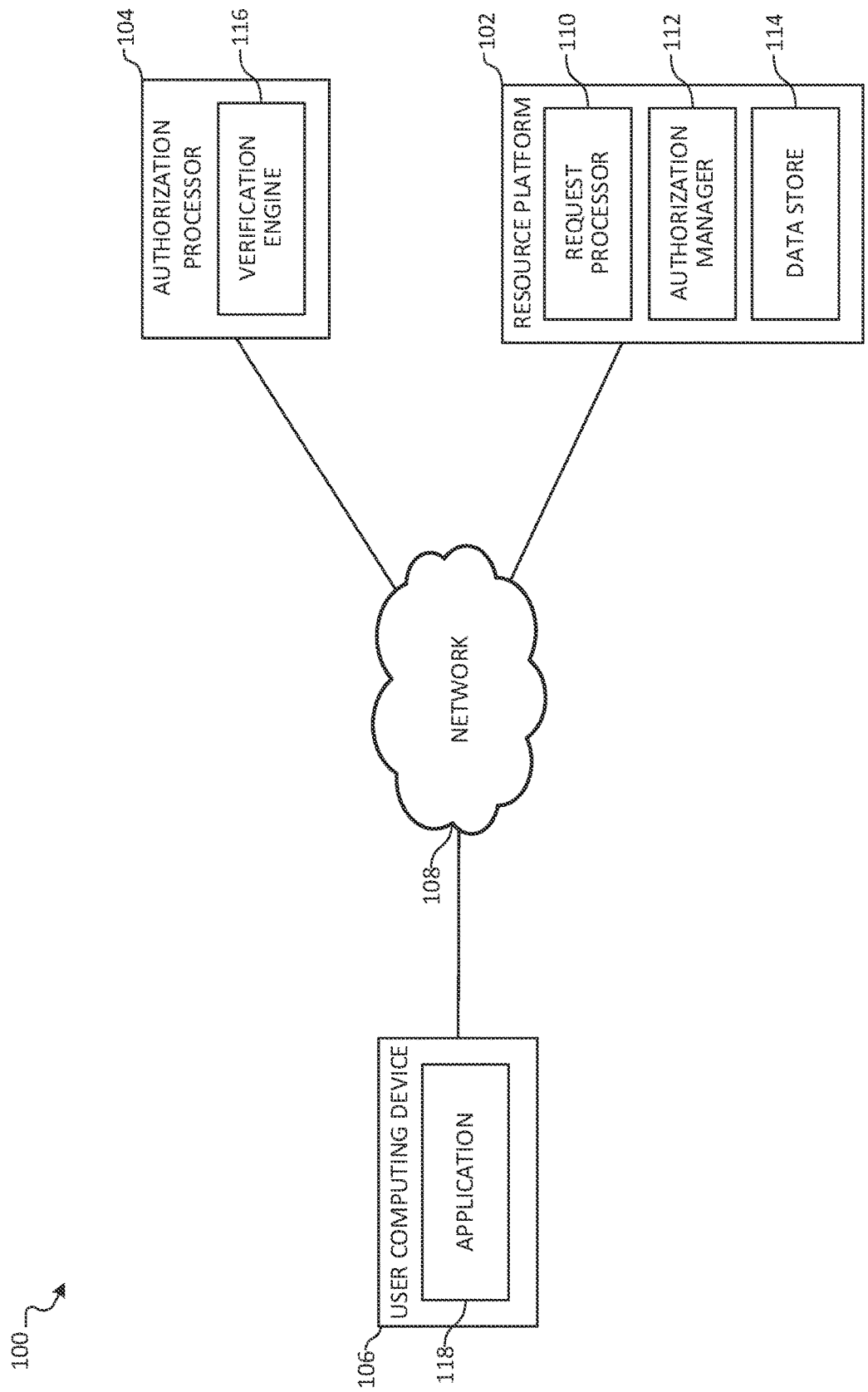

TRANSACTION SECURITY TECHNIQUES

BACKGROUND

A resource platform may facilitate transactions between users. However, verifying users and authorizing associated transactions may introduce additional complexity to transactions via the resource platform, especially in instances where an authorization processor performs at least some aspects of the verification (e.g., separate from the resource platform).

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to transaction security techniques. In examples, a resource platform causes a set of executable verification instructions associated with an authorization processor to be executed by a user computing device. The verification instructions may be encrypted by the authorization processor for decryption by the user computing device. The verification instructions may generate verification information associated with the user computing device. In some instances, the verification information may be encrypted for decryption by the authorization processor.

The encrypted verification instructions may be provided to the authorization processor (e.g., via the resource platform), such that the authorization processor may provide an indication to the resource platform as to whether the verification is verified. Accordingly, if the verification information is verified a transaction associated with the resource platform may proceed or, as another example, the user computing device may be granted access to information.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 1 illustrates an overview of an example system for performing aspects of the transaction security techniques described herein.

DETAILED DESCRIPTION

Figure 2A:
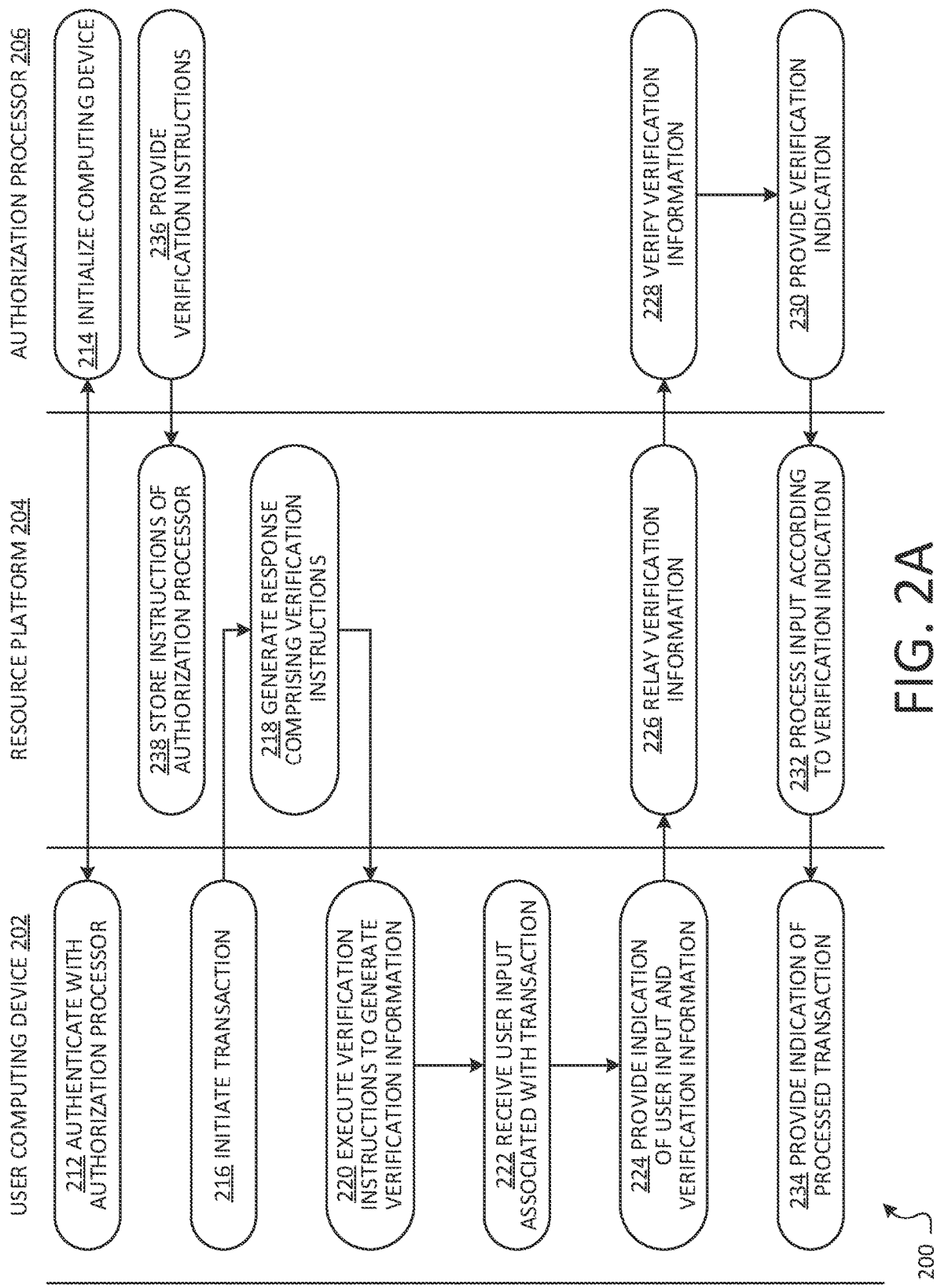
FIGS. 2A-2B illustrate overviews of example process flows for performing aspects of the transaction security techniques described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A resource platform may be employed by a user to exchange resources with another user. In examples, an authorization processor verifies aspects of a transaction performed by a resource platform, thereby providing security to the resource platform, authorization processor, and users associated with the transaction. However, in some instances, a user's computing device may be redirected to the authorization processor (e.g., and away from the resource platform), so as to enable the authorization processor to verify aspects of the user computing device. This redirection may be disruptive to the user experience offered by the resource platform (e.g., the authorization processor may offer a user interface (UI) or user experience (UX) that is not consistent with the resource platform), may introduce delays (e.g., as a result of data transmission delays, page rendering delays, and/or the amount of redirections), and/or may result in added complexity (e.g., as a result of handing off a user's session from the resource platform to the authorization processor and back from the authorization processor to the resource platform).

Accordingly, aspects of the present disclosure relate to transaction security techniques. In examples, an authorization processor provides a set of executable verification instructions that are executable by a user computing device to perform verification of the user computing device. The authorization processor may provide the verification instructions in an encrypted form, such that they may be stored by a resource platform and provided to a user computing device (e.g., as part of a request to access information or to perform a transaction via the resource platform). In other examples, the resource platform provides an indication of the verification instructions associated with the authorization processor, such that the user computing device may obtain the verification instructions from the authorization processor.

The user computing device may decrypt the verification instructions, execute the verification instructions, and provide verification information to the resource platform. The verification information may be provided in an encrypted form, such that the resource platform is unable to decrypt the verification information. The resource platform may provide the verification information to the authorization processor, which may be able to decrypt the verification information, perform verification based on the verification information, and provide an indication to the resource platform whether the user computing device is verified.

Thus, the verification instructions associated with the authorization processor and the verification information associated with the user computing device are "opaque" at least with respect to the resource platform, such that the resource platform is unable to determine which aspects of the user computing device are evaluated as part of the verification process. Further, the authorization processor is assured that the requisite verification information is collected via the verification instructions, such that the user computing device need not be redirected to the authorization processor as part of the verification process. Thus, the disclosed techniques reduce the impact of verification by the authorization processor, for example with respect to the UI and UX aspects, as well as with respect to the computing overhead associated with redirecting the user computing device to the authorization processor for verification.

FIG. 1 illustrates an overview of an example system 100 for performing aspects of the transaction security techniques described herein. As illustrated, system 100 comprises resource platform 102, authorization processor 104, user computing device 106, and network 108. In examples, resource platform 102, authorization processor 104, and user computing device 106 may communicate via network 108. For example, network 108 may comprise a local area network, a wireless network, or the Internet, or any combination thereof, among other examples.

User computing device 106 may be any of a variety of computing devices, including, but not limited to, a mobile computing device, a tablet computing device, a laptop computing device, or a desktop computing device. As illustrated, user computing device 106 comprises application 118. In examples, application 118 may be a native application, a web application (e.g., executing in a browser), or a combination thereof. Application 118 may communicate with resource platform 102 and may obtain and cause execution of a set of verification instructions according to aspects of the present disclosure. Thus, it will be appreciated that the techniques described herein may be applied in any of a variety of contexts.

For example, verification instructions may be in a compiled form, such that they are executed by user computing device 106 (e.g., natively, using a virtual machine, etc.). As another example, verification instructions may be interpreted and/or may comprise one or more calls to an application programming interface (API) provided by application 118, user computing device 106, and/or one or more libraries. As an example, a standardized API may be implemented by user computing device 106, which may be used by multiple authorization processors even if associated verification instructions are different for each authorization processor. Thus, it will be appreciated that verification instructions may be provided in any of a variety of forms.

Resource platform 102 may be any of a variety of computing devices and, in some examples, may be a plurality of computing devices. As discussed above, resource platform 102 may facilitate transactions associated with any of a variety of resources. For example, resources associated with resource platform 102 include, but are not limited to, data (e.g., text, images, audio, or binary data), one or more physical items, and/or currency. Thus, resource platform 102 may enable users to exchange electronic communications comprising text, images, and/or video data. As a further example, a resource platform may enable users to exchange data and/or items in exchange for currency. Thus, it will be appreciated that transactions facilitated by resource platform 102 need not be for resources of like kind.

As illustrated, resource platform 102 comprises request processor 110, authorization manager 112, and data store 114. In examples, request processor 110 processes requests associated with resources of resource platform 102, as may be received from user computing devices, such as user computing device 106. For example, an indication of a resource may be received from another user computing device (not pictured). Request processor 110 may process the received indication and generate an entry in data store 114 associated with the resource.

Accordingly, user computing device 106 may initiate a transaction for the resource. For example, user computing device 106 may initiate a "checkout" procedure, whereby a user of user computing device 106 initiates a transaction for the resource in exchange for one or more other resources. In other examples, the described verification techniques may be applied in instances where user computing device 106 is requesting information from resource platform 102 or is attempting to update information stored by resource platform 102. Thus, it will be appreciated that the techniques described herein may be implemented in any of a variety of contexts and need not be limited to transaction verification.

Authorization manager 112 may cause the transaction to be verified by authorization processor 104 according to aspects described herein. For example, authorization manager 112 may cause request processor 110 to provide a set of verification instructions to user computing device 106. In some instances, the provided set of verification instructions may have been received from authorization processor 104 and stored in data store 114, such that authorization manager 112 may determine the transaction is associated with authorization processor 104 and retrieve the associated set of verification instructions from data store 114 accordingly. As another example, an indication of the verification instructions may be provided (e.g., as a uniform resource locator (URL) or using an identifier, among other examples) to user computing device 106, thereby causing user computing device 106 to obtain them from authorization processor 104.

Authorization processor 104 may be any of a variety of computing devices and, in some examples, may comprise a plurality of computing devices. In some instances, authorization processor 104 may maintain a user account associated with a user of user computing device 106, such that authorization processor 104 may verify the identity of the user and/or information associated with user computing device 106 as part of a verification process according to aspects described herein. For example, authorization processor 104 may comprise an identity service, such that authorization processor 104 may provide an indication to resource platform 102 that the user associated with user computing device 106 should be permitted to proceed with a transaction and/or should be granted access to information, among any of a variety of actions and associated permissions.

In other examples, authorization processor 104 may manage one or more resources of the user, such that authorization processor 104 enables resource platform 102 to complete a transaction relating to such resources. For example, authorization processor 104 may be an issuing bank and/or a transaction processor, such that verification performed by authorization processor enables a user to transact using an account associated therewith. Thus, it will be appreciated that the aspects described herein may be applicable to any of a variety of authorization processors.

As illustrated, authorization processor 104 comprises verification engine 116. In examples, user computing device 106 may authenticate with verification engine 116. For example, a username, password, unique identifier (e.g., an account number or signature), and/or additional or alternative authentication information may be provided by a user via user computing device 106, such that verification engine 116 may determine that the user is associated with authorization processor 104. In response, verification engine 116 may provide session information. Session information may be device-specific or user-specific, among other examples. Example session information includes, but is not limited to, a session identifier, an authentication token, and/or one or more cryptographic keys. Thus, session information may be usable by verification engine 116 to determine that user computing device 106 has been previously authenticated.

In other examples, a cryptographic key of the session information may be a public key of a key pair, where verification engine 116 retains the associated private key. Verification information generated by user computing device 106 may be encrypted using the public key, such that verification engine 116 may decrypt the verification information accordingly. In other examples, symmetric cryptography may be used as an alternative or in addition to asymmetric cryptography. For example, a symmetric key may be provided with which user computing device 106 may decrypt verification instructions in order to execute the verification instructions as described herein. It will be appreciated that such cryptographic keys may be user-specific or device-specific. In some instances, the cryptographic keys may be periodically rotated, thereby causing the user of user computing device 106 to re-authenticate with authorization processor 104.

In examples, verification engine 116 provides verification instructions for execution by a user computing device, such as user computing device 106. For example, verification engine 116 may provide the verification instructions to resource platform 102, which may be stored in data store 114 as discussed above. In other examples, verification engine 116 provides the verification instructions in response to a request from user computing device 106. It will be appreciated that any of a variety of techniques may be used to provide such verification instructions to a user computing device. For example, the verification instructions may be cached by user computing device 106, such that updates to the stored verification instructions may be provided by authorization processor 104 and/or resource platform 102. In some examples, the session information may be usable to verify a cryptographic signature and/or cryptographic hash associated with the verification instructions, such that the authenticity of the verification instructions (e.g., that they originated from authorization processor 104) may be verified.

As discussed above, application 118 obtains verification instructions associated with authorization processor 104 (e.g., as may have been provided by verification engine 116 to resource platform 102 or in response to a request from user computing device 106). Accordingly, user computing device 106 executes the verification instructions, at least a part of which may be decrypted using a cryptographic key of session information that was received from authorization processor 104. As a result, verification information is generated, for example relating to user computing device 106 and/or one or more users associated therewith. Verification information includes, but is not limited to, an Internet Protocol (IP) address, a Media Access Control (MAC) address, one or more browser cookies or at least a part of the session information associated with authorization processor 104, biometric information, information from a cryptographic hardware device such as a security key or trusted platform module (TPM), and/or user behavior information. In some instances, the verification information may comprise information associated with previous verification procedures (e.g., stored by user computing device 106), as may be performed for resource platforms other than resource platform 102. A user may opt-in to supplemental verification techniques. Accordingly, if the verification instructions determine that the user has opted in, biometric information and/or user signals associated with a user's operation of user computing device 106 may be collected and/or analyzed. Example user signals include user input associated with entering information associated with authorization processor 104, such as an account number, address, or other information.

While example verification information is described, it will be appreciated that any of a variety of verification information may be generated according to aspects of the present disclosure. Further, it will be appreciated that verification instructions provided to the user computing device need not be static. For example, different verification instructions and/or resulting verification information may be used depending on a risk associated with a transaction and/or a user, among other examples.

The verification instructions may be encrypted using a cryptographic key of the session information discussed above. For example, a public key may be used to encrypt the verification information, thereby enabling authorization processor 104 to decrypt the verification information accordingly. In some instances, the verification information may be cryptographically signed using a cryptographic key associated with the user and/or user computing device 106, thereby enabling authorization processor 104 to verify its origin. In other examples, the asymmetric key pair may be associated with the user and/or user computing device 106, such that the origin of the verification information may be verified based on whether the information can be decrypted using the appropriate cryptographic key.

The verification information is provided to authorization processor 104 by computing device 106, for example via resource platform 102. In other examples, the verification information may be provided directly to authorization processor 104. In some instances, the verification instructions may comprise an indication as to how and/or where to provide the verification information. Accordingly, verification engine 116 receives the verification information and processes the verification information accordingly. For example, the verification information may be decrypted and processed according to a user profile associated with the user. In other instances, the verification information may be processed according to one or more statistical and/or machine learning models usable to determine whether the verification information is indicative of fraud.

As a result of the verification performed by verification engine 116, an indication may be provided to resource platform 102 whether the verification was successful (e.g., and a transaction should proceed), whether additional information is needed (e.g., in which case user computing device 106 may be directed to authorization processor 104 and/or additional information may be requested from user computing device 106), or whether verification was unsuccessful (and the transaction should not proceed and/or access should not be granted).

Thus, aspects of the present disclosure enable resource platform 102 to collect verification information from user computing device 106 that is usable for verification by authorization processor 104 without necessarily redirecting user computing device 106 to authorization processor 104. Further, proprietary or otherwise secret aspects of the verification process need not be disclosed to resource platform 102, as a result of the cryptographic techniques described above. As an additional benefit, the verification instructions need not be static and may be adapted or otherwise changed based on any of a variety of factors. It will be appreciated that such benefits are nonlimiting and nonexclusive.

The functionality discussed above with respect to system 100 is provided as an example and, in other examples, the functionality may be distributed according to any of a variety of other paradigms. For example, resource platform 102 may comprise a verification engine 116. It will be further appreciated that any number of the disclosed elements may be used. For example, multiple user computing devices, resource platforms, and/or authorization processors may be used. Thus, as noted above, authorization processor 104 may process verification information associated with multiple resource platforms and, similarly, resource platform 102 may provide verification instructions from any of a variety of authorization processors.

Figure 2B:
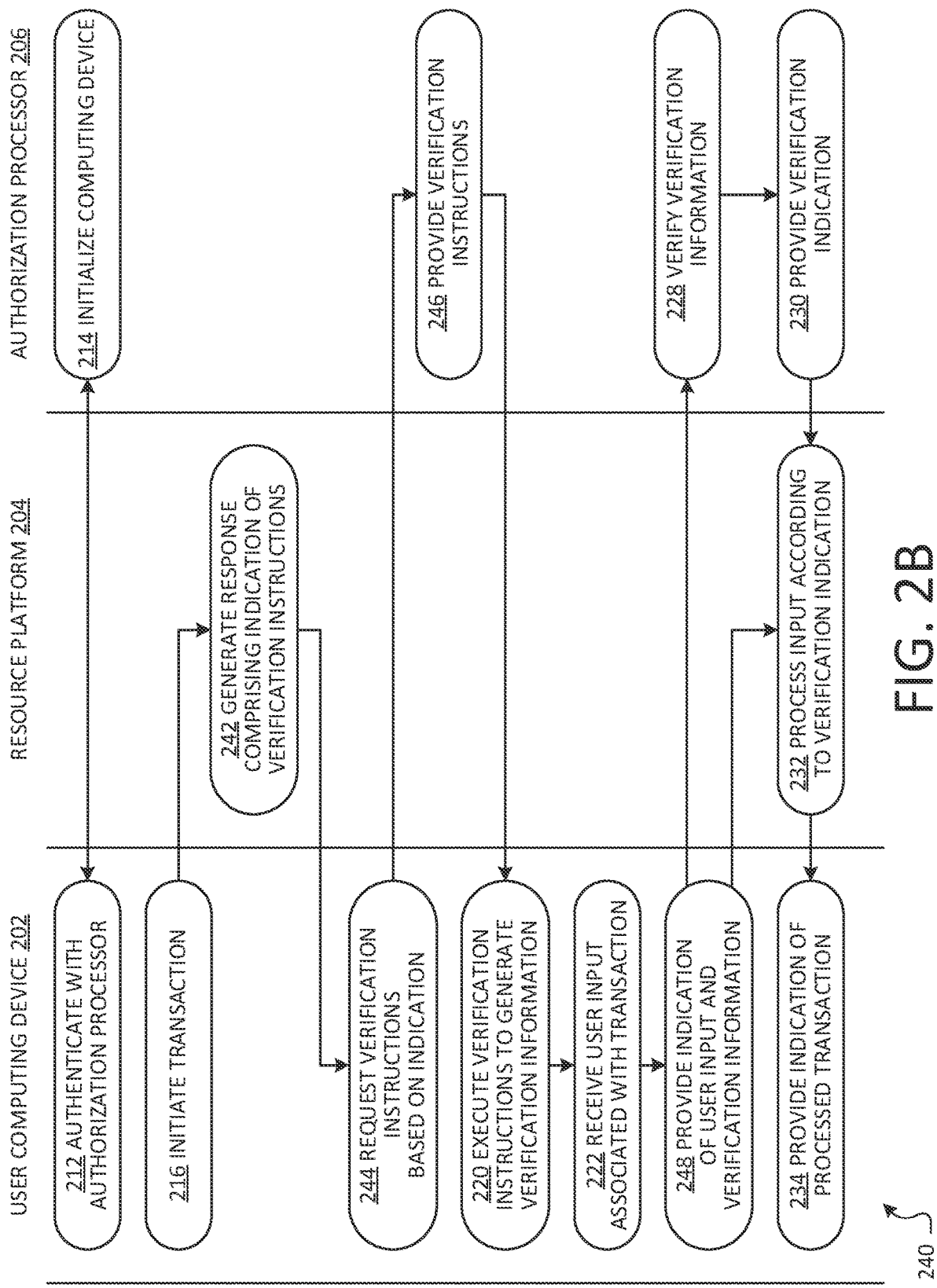

FIGS. 2A-2B illustrate overviews of example process flows 200 and 240 for performing aspects of the transaction security techniques described herein. As illustrated, FIGS. 2A-2B illustrate exchanges between user computing device 202, resource platform 204, and authorization processor 206. User computing device 202 may be similar to user computing device 106 in FIG. 1, while resource platform 204 may be similar to resource platform 102 and authorization processor 206 may be similar to authorization processor 104. Accordingly, certain aspects may be not be re-described in detail below.

With reference specifically to FIG. 2A, flow 200 begins at operation 212, where user computing device 202 authenticates with authorization processor 206, such that authorization processor 206 initializes user computing device 202 at operation 214. For example, user computing device 202 may provide authentication information, such that authorization processor 206 generates session information and provides the generated session information in response.

Flow 200 is further illustrated as comprising operation 236, where authorization processor 206 provides verification instructions to resource platform 204, which are stored in association with authorization processor 206 at operation 238. As discussed above, the verification instructions may be encrypted, such that they are opaque with respect to resource platform 204.

At operation 216, user computing device 202 initiates a transaction. For example, user input may be received by user computing device 202 to transact for a resource of resource platform 204. In other examples, a request for access to information may be generated or similar techniques may be used to perform verification associated with any of a variety of other operations. Accordingly, at operation 218, resource platform 204 generates a response comprising verification instructions. As discussed above, the verification instructions stored in operation 238 may have been stored in a data store, such that the verification instructions may be accessed from the data store accordingly. In some instances, an indication as to authorization processor 206 is received from user computing device 202, such that the indication may be used to identify the verification instructions as a result of an association between authorization processor 206 and the verification instructions. In other examples, operations 236 and 238 may be omitted, such that resource platform 204 may request the verification instructions in response to operation 216.

Resource platform 204 provides the verification instructions to user computing device 202, which are received and executed at operation 220. Accordingly, verification information is generated. In examples, operation 220 comprises decrypting at least a part of the verification instructions based on session information that was received at operation 212. Similarly, the verification information may be encrypted using a cryptographic key of the session information.

At operation 222, user input associated with the transaction is received. For example, the user input may comprise a confirmation to proceed with the transaction that was initiated at operation 216. As another example, the user input may comprise an indication as to an account or other identifier associated with authorization processor 206 and/or contact information (e.g., a mailing address, a billing address, a phone number, and/or an email address). Flow progresses to operation 224, where an indication of the received user input and generated verification information is provided to resource platform 204, such that resource platform 204 relays the verification information to authorization processor 206 at operation 226. In some examples, resource platform 204 may transmit additional information as part of the relayed verification information, such as information associated with the transaction and/or an active session of user computing device 202 with resource platform 204.

Accordingly, the verification information is verified by authorization processor 206 at operation 228. For example, authorization processor 206 may decrypt the verification information and process the decrypted verification information according to any of a variety of techniques to determine whether user computing device 202 and/or a user associated therewith is permitted to complete the transaction. Flow progresses to operation 230, where a verification indication is provided to resource platform 204, such that resource platform 204 processes the user input and verification indication accordingly at operation 232. For example, operation 232 may comprise completing the transaction if the verification indication comprises an indication that verification was successful. In other examples, resource platform 204 may process the verification indication to determine why verification was not successful.

Accordingly, at operation 234, user computing device 202 provides an indication of the transaction that was processed by resource platform 204. For example, an indication may be provided that the transaction was successful or that the transaction failed and, in some examples, one or more reasons as to why the transaction failed. Flow 200 terminates at operation 234.

Flow 240 of FIG. 2B illustrates alternative examples of aspects of flow 200 discussed above with respect to FIG. 2A. Accordingly, certain operations of flow 240 are similar to those of flow 200 and are therefore not necessarily re-described below in detail.

For example, flow 240 comprises operation 242, where a response is generated comprising an indication of verification instructions associated with authorization processor 206. Thus, as compared to flow 200, resource platform 204 need not provide the verification instructions but may instead direct user computing device 202 to obtain the verification instructions from authorization processor 206 at operation 244. In response, authorization processor 206 provides the verification instructions at operation 246, such that they are processed at operation 220 as discussed above. Thus, it will be appreciated that resource platform 204 need not provide the verification instructions but rather, in some examples, may provide an indication to user computing device 202. For example, the indication may comprise a URL or other identifier with which user computing device 202 may access or otherwise request the verification instructions.

Additionally, flow 240 is illustrated as comprising operation 248, where an indication of user input is provided to resource platform 204 for processing at operation 232, while the indication of verification information is provided directly to authorization processor 206 for processing at operation 228, rather than being relayed via operation 226 discussed above with respect to FIG. 2A. Thus, user computing device 202 need not provide verification information to resource platform 204, but may instead provide at least a part of the verification information directly to authorization processor 206 in some examples.

Thus, it will be appreciated that such differences may be utilized in combination or separately (e.g., resource platform 204 may provide the verification instructions, while user computing device may provide the verification information to authorization processor 206 directly). It will be appreciated that any of a variety of other variations may be implemented according to aspects of the present disclosure. For example, resource platform 204 may store verification instructions in some instances (e.g., for some authorization processors), while resource platform 204 may provide an indication as to how to access verification instructions in other instances.

Figure 3:
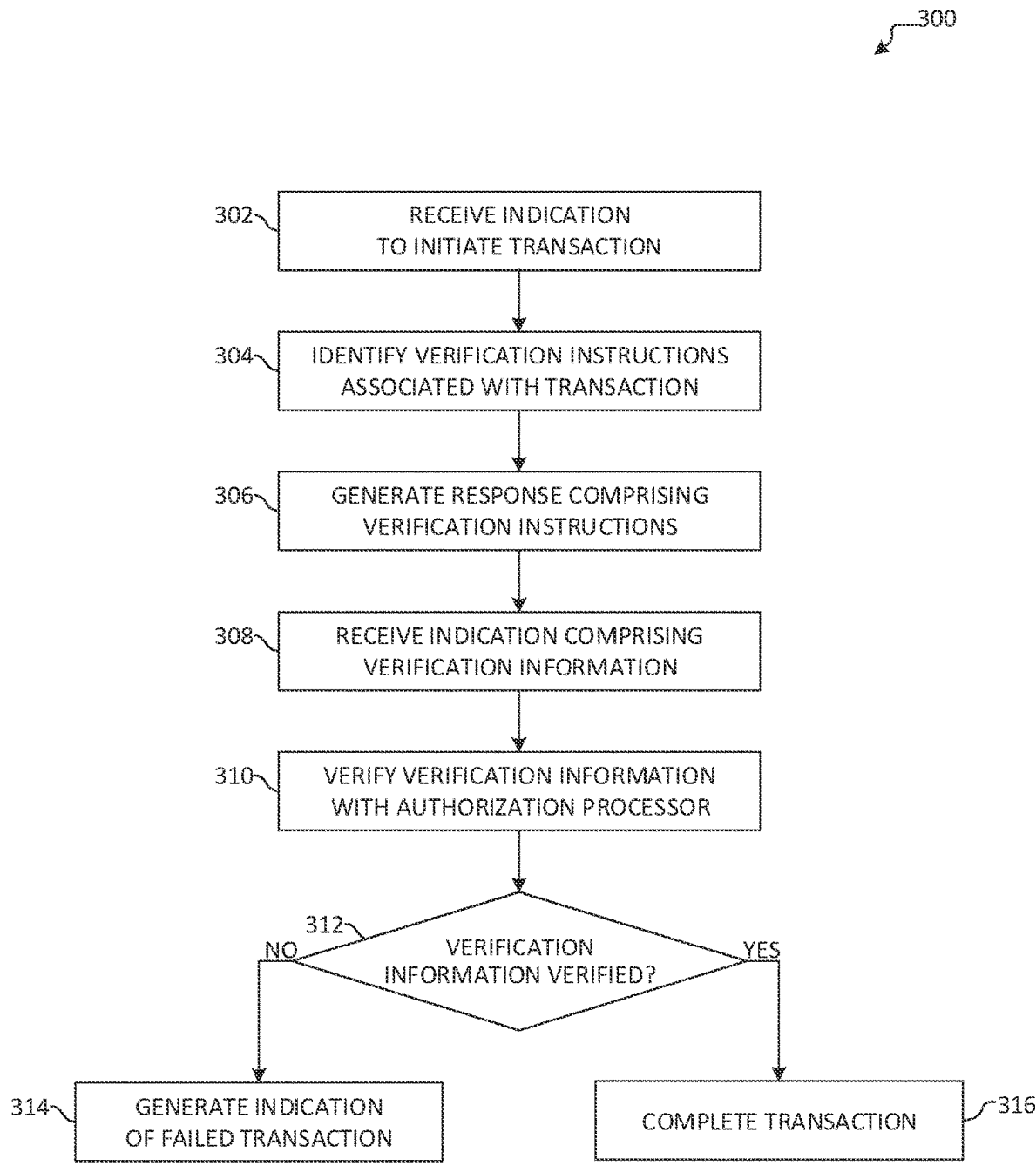
FIG. 3 illustrates an overview of an example method for transaction verification by a resource platform.

FIG. 3 illustrates an overview of an example method 300 for transaction verification by a resource platform, such as resource platform 102 in FIG. 1 or resource platform 204 in FIG. 2. As illustrated, method 300 begins at operation 302, where an indication to initiate a transaction is received. For example, the indication may be received from a user computing device, such as user computing device 106 in FIG. 1 or user computing device 202 in FIG. 2. The indication may comprise a resource of the resource platform. In some examples, the indication comprises an indication as to an authorization processor associated with the transaction and/or the user, such as authorization processor 104 in FIG. 1 or authorization processor 206 in FIG. 2.

At operation 304, verification instructions associated with the transaction are identified. For example, verification instruction may be accessed from a data store (e.g., data store 114 in FIG. 1). In some instances, an indication as to an authorization processor is received as part of operation 302, such that the indication may be used to identify the verification instructions as a result of an association between an authorization processor and the identified verification instructions. In some instances, operation 304 may comprise identifying a URL or other identifier associated with the verification instructions rather than the instructions themselves.

Flow progresses to operation 306, where a response is generated comprising the verification instructions identified at operation 304. For example, the response may comprise a webpage including at least a part of the verification instructions. As another example, the webpage may comprise a reference to the verification instructions (e.g., as may be stored by an authorization processor). The response may comprise information associated with the transaction, including one or more resources associated therewith and, in some examples, an indication as to one or more resources to be provided by the user in exchange.

At operation 308, an indication is received comprising verification information, as may be generated by the user computing device according to aspects described herein. In examples, the verification information is received in combination with an indication as to user input that was received by the user computing device. While method 300 is illustrated as receiving verification information at operation 308, it will be appreciated that, in other examples, a user computing device may instead provide the verification information to an authorization processor, such that the indication as to user input is received without verification information at operation 308.

Moving to operation 310, the verification information is verified with an authorization processor associated therewith. In examples, operation 310 comprises providing the verification information to the authorization processor and receiving an indication as to whether the verification information is verified in response. In other examples, an indication may be received from the verification processor (e.g., as a result of a user computing device providing the verification information directly to the authorization processor).

At determination 312, it is determined whether the verification information is verified. As noted above, the authorization processor may indicate that the verification information is verified successful or that it has not been verified. It will be appreciated that the authorization processor may provide any of a variety of other indications, for example that additional information is required.

If it is determined that the verification information is not verified, flow branches "NO" to operation 314, where an indication of a failed transaction is generated. For example, the indication may comprise a webpage that indicates the initiated transaction was not successful. In some instances, the indication further comprises a reason as to why verification was not successful and/or one or more suggestions that the user may use to remedy the verification failure (e.g., as may be provided by the authorization processor and/or generated by the resource platform). Flow terminates at operation 314.

If, however, it is determined that verification is successful at determination 312, flow instead branches "YES" to operation 316, where the transaction is completed. In examples, completing the transaction comprises associating a resource for which the user is transacting with an account of the user, generating an email confirmation, and/or providing a webpage indicating transaction success, among other examples. While method 300 is discussed with respect to verification in the context of a transaction, it will be appreciated that similar techniques may be used for access verification, among other examples. Flow terminates at operation 316.

Figure 4:
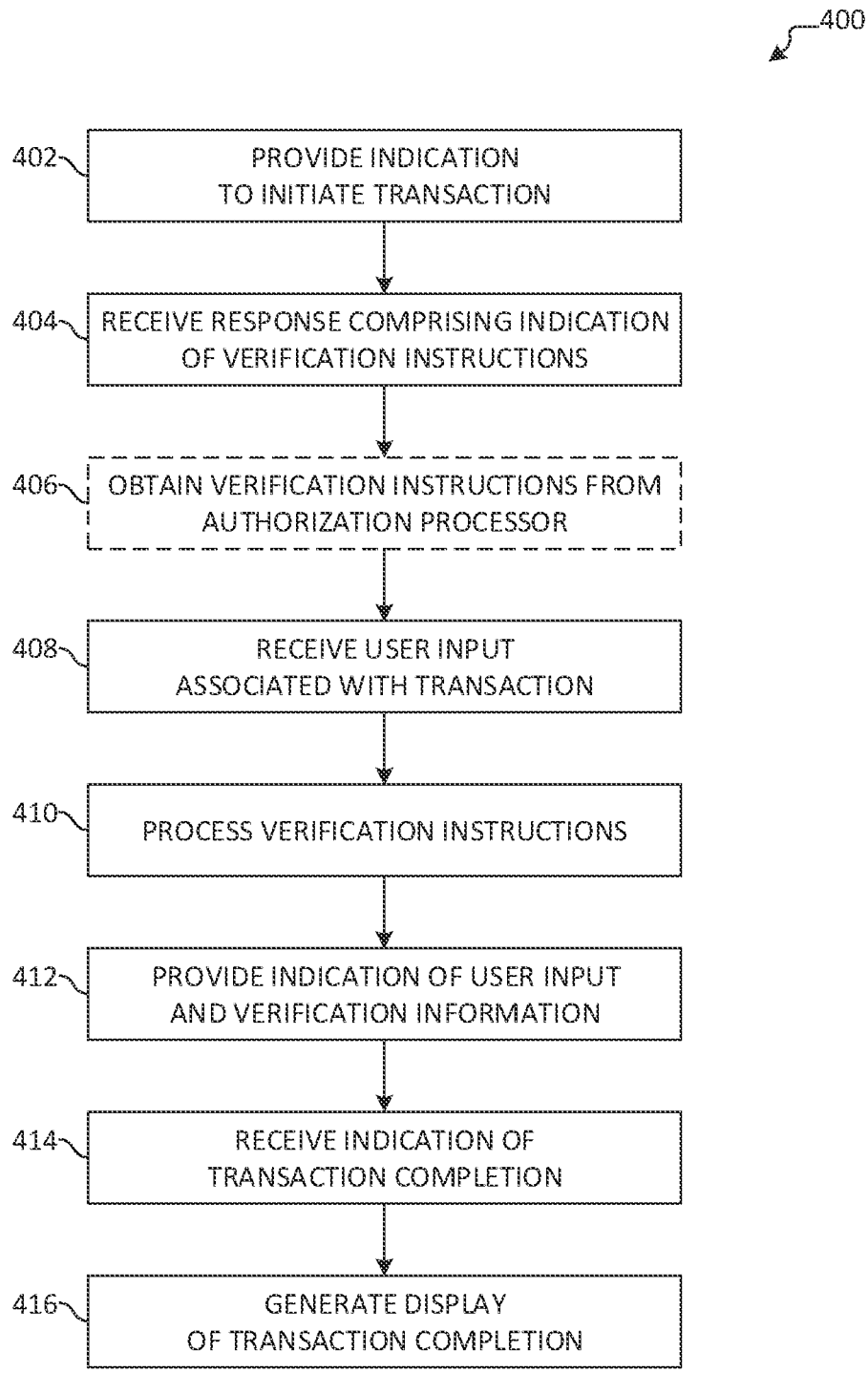
FIG. 4 illustrates an overview of an example method for transaction verification by a user computing device.

FIG. 4 illustrates an overview of an example method for transaction verification by a user computing device, such as user computing device 106 in FIG. 1 or user computing device 202 in FIG. 2. Method 400 begins at operation 402, where an indication to initiate a transaction is provided. For example, the indication may be provided to a resource platform, such as resource platform 102 in FIG. 1 or resource platform 204 in FIG. 2. In examples, the indication may comprise a reference to a resource of the resource platform. In some examples, the indication comprises an indication as to an authorization processor associated with the transaction and/or the user, such as authorization processor 104 in FIG. 1 or authorization processor 206 in FIG. 2.

Flow progresses to operation 404, where a response is received comprising verification instructions. For example, the response may comprise verification instructions associated with an authorization processor. In other examples, the response comprises a reference to verification instructions rather than the verification instructions themselves. The response may further comprise information associated with the transaction and/or a form or one or more fields with which to receive user input. The response may be received as a result of a resource platform performing aspects of operation 306 discussed above with respect to method 300 in FIG. 3.

At operation 406, verification instructions are obtained from the authorization processor. For example, if the response received at operation 404 comprised an indication as to the verification instructions, the indication may be used to obtain the verification instructions accordingly. In instances where the response comprised the verification instructions, operation 406 may be omitted.

Flow progresses to operation 408, where user input associated with the transaction is received. For example, the use may input information into a form or fields, as was discussed above with respect to operation 404. In other examples, the user input may comprise an indication to proceed with the transaction. It will be appreciated that any of a variety of additional or alternative user inputs may be received.

Flow progresses to operation 410, where the verification instructions are processed. In examples, processing the verification instructions may comprise decrypting the verification instructions, for example based on a cryptographic key that was received from an authorization processor as part of session information, as discussed above. Accordingly, verification information is generated according to the aspects described herein. In examples, the verification information is encrypted, for example using a cryptographic key that was received from an authorization processor as part of session information. It will be appreciated that operations 408 and 410 may be performed at least partially contemporaneously, such that operation 410 may comprise evaluating user behavior signals as part of verification information generation.

At operation 412, an indication of the user input that was received at operation 408 and the verification instructions that were generated at operation 410 are provided. For example, they may be provided to a resource platform. In other examples, the verification information may be provided to an authorization processor, while the indication of user input is provided to the resource platform.

Flow progresses to operation 414, where an indication of transaction completion is received. For example, the indication may indicate that the transaction was successful (e.g., in instances where the verification information is successfully verified) or that the transaction was not successful (e.g., in instances where the verification information is not successfully verified). Accordingly, at operation 416, a display associated with the indication received at operation 414 is generated. For example, a confirmation may be displayed, a reason as to why the transaction failed may be displayed, or additional information may be requested (e.g., such that the transaction may be retried by performing method 400 again). Flow terminates at operation 416.

Figure 5:
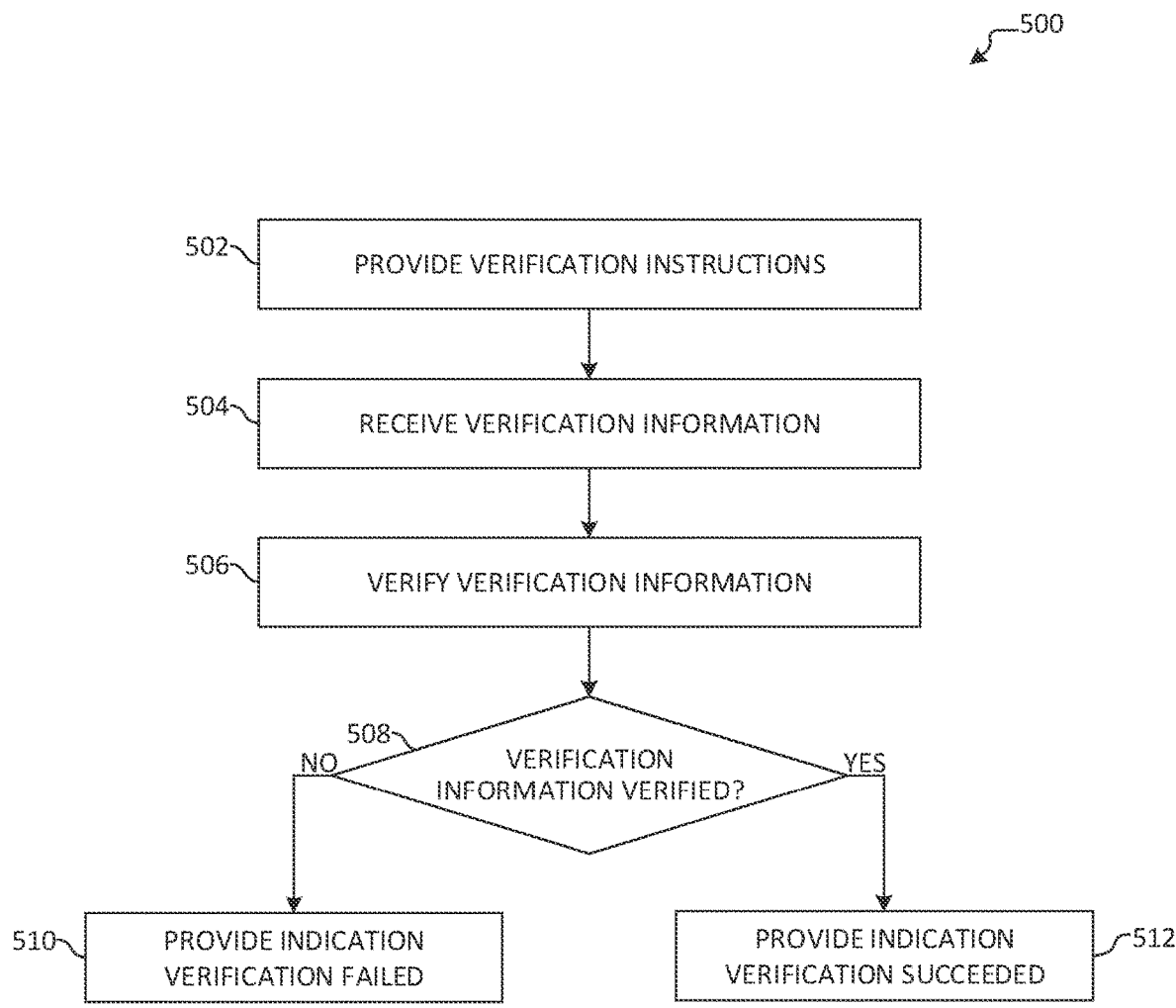
FIG. 5 illustrates an overview of an example method for verification by an authorization processor.

FIG. 5 illustrates an overview of an example method 500 for verification by an authorization processor. In examples, aspects of method 500 may be performed by an authorization processor, such as authorization processor 104 in FIG. 1 or authorization processor 206 in FIG. 2. As illustrated, method 500 begins at operation 502, where verification instructions are provided. For example, verification instructions may be provided to a resource platform (e.g., resource platform 102 in FIG. 1 or resource platform 204 in FIG. 2), where they may be stored and/or provided to a user computing device, among other examples. In other instances, the verification instructions may be provided to a user computing device, for example in response to a request for the verification instructions as may be generated as a result of the user computing device performing aspects of operation 406 discussed above with respect to FIG. 4. It will be appreciated that, in some instances, operation 502 may be omitted (e.g., such that method 500 begins at operation 504), as may be the case when a resource platform caches and/or provides verification instructions on behalf of an authorization processor.

At operation 504, verification information is received. In examples, the verification information is received from a resource platform (e.g., as a result of performing operation 310 in FIG. 3) or from a user computing device (e.g., as a result of performing operation 412 in FIG. 4). Accordingly, the verification information is processed at operation 506 to verify the verification information. For example, the verification information may be decrypted (e.g., based on a private key associated with the user and/or user computing device). The decrypted verification information may be processed according to any of a variety of techniques, for example to determine whether a transaction associated therewith is authorized.

Accordingly, at determination 508, it is determined whether the verification information is verified. If it is not determined that the verification information is verified, flow branches "NO" to operation 510, where an indication is provided that verification failed. For example, the indication may be provided to a resource platform. Thus, in some examples, verification information may be received from a user computing device, while the indication that verification was not successful may instead be provided to a resource platform. In some instances, the verification comprises a reason verification failed and/or a suggestion for achieving successful verification in a subsequent attempt. Flow terminates at operation 510.

If, however, it is determined that the verification information is verified at determination 508, flow instead branches "YES" to operation 508, where an indication that verification succeeded is provided. Similar to operation 510, the indication may be provided to a resource platform, even in instances where the verification information was received from a device other than a device of the resource platform. Flow terminates at operation 512.

Figure 6:
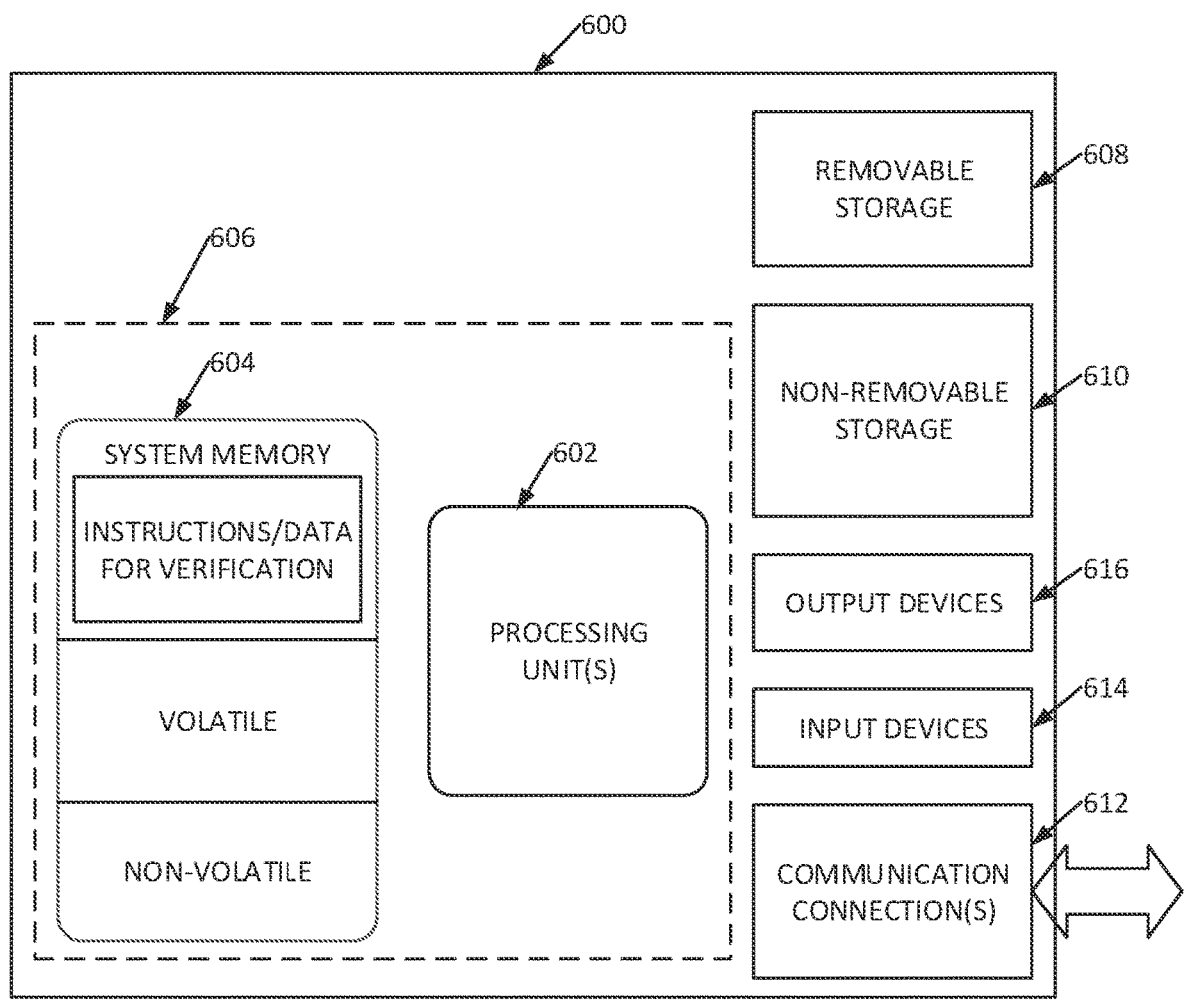
FIG. 6 illustrates an example of a suitable operating environment in which one or more aspects of the present application may be implemented.

FIG. 6 illustrates an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein such as the methods illustrated in FIG. 2A, 2B, 3, 4, or 5, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a system comprising: receiving, from a computing device, a request to initiate a transaction for a resource of a resource platform; providing a response to the request comprising verification instructions associated with an authorization processor that, when executed by the computing device, generate verification information associated with the computing device; receiving, from the computing device, generated verification information; providing the generated verification information to the authorization processor; and based on receiving an indication from the authorization processor that the verification information is verified, providing a successful transaction indication to the computing device. In an example, generating the verification information comprises encrypting data using a public key associated with a private key of the authorization processor, thereby protecting the generated verification information from access by the resource platform. In another example, the verification instructions further comprise an instruction to access stored data associated with a user of the computing device. In a further example, the stored data is further associated with another resource platform. In yet another example, the verification instructions further comprise instructions to: determine whether a user has opted into supplemental verification; and based on determining the user has opted into supplemental verification, generate additional verification information. In a further still example, receiving the generated verification information further comprises receiving an indication of user input at the computing device. In another example, the request to initiate the transaction comprises an indication of the authorization processor.

In another aspect, the technology relates to a method for transaction verification by a user computing device. The method comprises: receiving, from a resource platform, verification instructions associated with an authorization processor; executing, by the user computing device, the verification instructions to generate verification information associated with the user computing device, wherein the verification information is protected from access by the resource platform; providing the generated verification instructions to the resource platform; and receiving, from the resource platform, an indication of successful verification. In an example, the method further comprises: providing, to the authorization processor, authentication information; and receiving, from the authorization processor, session information comprising a cryptographic key. In another example, executing the verification instructions comprises decrypting the verification instructions using the cryptographic key of the session information. In a further example, executing the verification instructions comprises encrypting the verification information using the cryptographic key to protect the verification information from access by the resource platform. In yet another example, the method further comprises: comprising verifying an association between the verification instructions and the authorization processor based on the session information and at least one of: a cryptographic signature of the verification instructions; or a cryptographic hash of the verification instructions. In a further still example, executing the verification instructions comprises: determining whether a user has opted into supplemental verification; and based on determining the user has opted into supplemental verification, generating additional verification information. In an example, the method further comprises obtaining the verification instructions from the authorization processor.

In a further aspect, the technology relates to a method for verification of a user computing device. The method comprises: receiving, from a computing device, a request to initiate a transaction for a resource of a resource platform; providing a response to the request comprising verification instructions associated with an authorization processor that, when executed by the computing device, generate verification information associated with the computing device; receiving, from the computing device, generated verification information; providing the generated verification information to the authorization processor; and based on receiving an indication from the authorization processor that the verification information is verified, providing a successful transaction indication to the computing device. In an example, generating the verification information comprises encrypting data using a public key associated with a private key of the authorization processor, thereby protecting the generated verification information from access by the resource platform. In another example, the verification instructions further comprise an instruction to access stored data associated with another resource platform. In a further example, the verification instructions further comprise instructions to: determine whether a user has opted into supplemental verification; and based on determining the user has opted into supplemental verification, generate additional verification information. In yet another example, receiving the generated verification information further comprises receiving an indication of user input at the computing device. In a further still example, the request to initiate the transaction comprises an indication of the authorization processor.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system to verify a transaction between a computing device and a resource platform, the system comprising:
   at least one processor; and
   memory storing instructions that, when executed by the at least one processor, causes the system to perform a set of operations, the set of operations comprising:
   receiving, by the resource platform from a computing device, a request to initiate a transaction for a resource of the resource platform;
   providing, by the resource platform to the computing device, a response to the request comprising verification instructions associated with an authorization processor that, when executed by the computing device, causes the computing device to generate verification information that is encrypted using a public key associated with a private key of the authorization processor such that the verification information is inaccessible by the resource platform, the resource platform triggering a verification process without redirecting the computing device to the authorization processor;
   receiving, by the resource platform from the computing device, the verification information;
   providing, by the resource platform, the verification information to the authorization processor, the authorization processor decrypting and verifying the verification information; and
   based on receiving an indication from the authorization processor that the verification information is verified, completing, by the resource platform, the transaction and providing, by the resource platform, a notification of successful completion of the transaction.

2. The system of claim 1, wherein providing the notification comprises:
   generating and providing an email confirmation; or
   providing a webpage indicating the completion of the transaction.

3. The system of claim 1, wherein the verification instructions further comprise an instruction to access stored data associated with a user of the computing device.

4. The system of claim 3, wherein the stored data is further associated with another resource platform.

5. The system of claim 1, wherein the verification instructions further comprise instructions to:
   determine whether a user has opted into supplemental verification; and
   based on determining the user has opted into supplemental verification, generate additional verification information.

6. The system of claim 1, wherein receiving the verification information further comprises receiving an indication of user input at the computing device.

7. The system of claim 1, wherein the request to initiate the transaction comprises an indication of the authorization processor.

8. The system of claim 1, wherein the operations further comprise:

in response to completing the transaction, associating a resource of the transaction with an account of a user associated with the computing device.

9. A method for verifying a transaction verification by between a user computing device and a resource platform, the method comprising:
　receiving, by the user computing device from the resource platform, verification instructions associated with an authorization processor;
　executing, by the user computing device, the verification instructions to generate verification information that is encrypted using a cryptographic key associated with the authorization processor such that the verification information is inaccessible by by the resource platform the resource platform triggering a verification process without redirecting the computing device to the authorization processor;
　providing the verification information to the resource platform, the resource platform transmitting the verification information onto the authorization processor, the authorization processor decrypting and verifying the verification information; and
　receiving, from the resource platform, a notification of successful completion of the transaction, the notification being generated by the resource platform in response to the verifying by the authorization processor and completion of the transaction by the resource platform.

10. The method of claim 9, further comprising:
　prior to the transaction, providing, to the authorization processor, authentication information; and
　receiving, from the authorization processor, session information comprising the cryptographic key.

11. The method of claim 10, wherein executing the verification instructions comprises decrypting the verification instructions using the cryptographic key of the session information.

12. The method of claim 10, wherein executing the verification instructions comprises encrypting the verification information using the cryptographic key to protect the verification information from access by the resource platform.

13. The method of claim 10, further comprising verifying an association between the verification instructions and the authorization processor based on the session information and at least one of:
　a cryptographic signature of the verification instructions; or
　a cryptographic hash of the verification instructions.

14. The method of claim 9, wherein executing the verification instructions comprises:
　determining whether a user has opted into supplemental verification; and
　based on determining the user has opted into supplemental verification, generating additional verification information.

15. The method of claim 9, wherein the cryptographic key comprises a public key of a key pair, wherein the authorization processor retains the associated private key.

16. A method for verifying a transaction between a user computing device and a resource platform, the method comprising:
　receiving, by a resource platform from a computing device, a request to initiate a transaction for a resource of the resource platform;
　providing, by the resource platform to the computing device, a response to the request comprising verification instructions associated with an authorization processor that, when executed by the computing device, causes the computing device to generate verification information that is encrypted using a public key associated with a private key of the authorization processor such that the verification information is inaccessible by the resource platform, the resource platform triggering a verification process without redirecting the computing device to the authorization processor;
　receiving, by the resource platform from the computing device, the verification information;
　providing, by the resource platform, the verification information to the authorization processor, the authorization processor decrypting and verifying the verification information; and
　based on receiving an indication from the authorization processor that the verification information is verified, completing, by the resource platform, the transaction and providing, by the resource platform, a notification of successful completion of the transaction.

17. The method of claim 16, wherein the verification instructions further comprise an instruction to access stored data associated with another resource platform.

18. The method of claim 16, wherein the verification instructions further comprise instructions to:
　determine whether a user has opted into supplemental verification; and
　based on determining the user has opted into supplemental verification, generate additional verification information.

19. The method of claim 16, wherein receiving the verification information further comprises receiving an indication of user input at the computing device.

20. The method of claim 16, wherein the request to initiate the transaction comprises an indication of the authorization processor.

* * * * *